(No Model.)
J. SPEAKMAN.
WIRE AND PICKET FENCE.
No. 471,831. Patented Mar. 29, 1892.
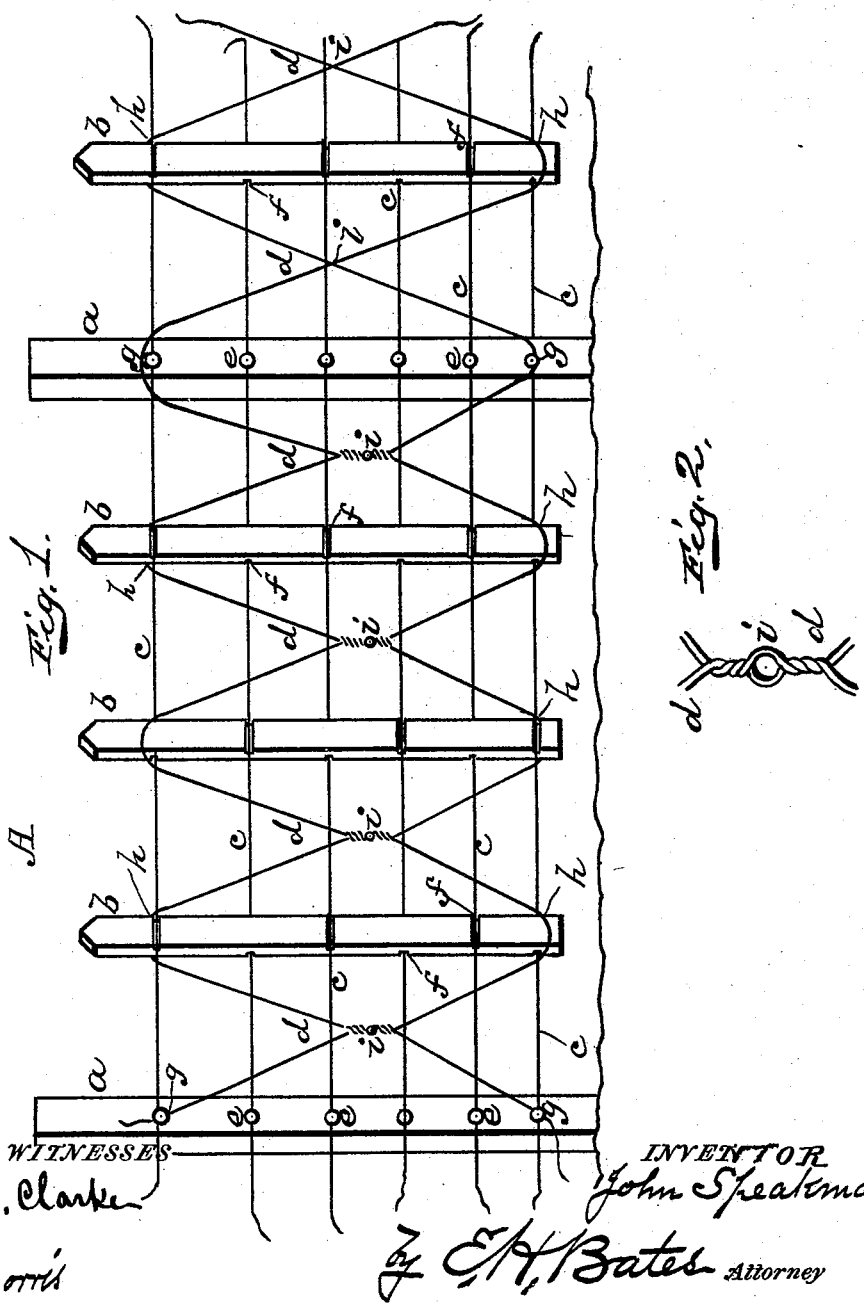

UNITED STATES PATENT OFFICE.

JOHN SPEAKMAN, OF NEW CASTLE, INDIANA.

WIRE-AND-PICKET FENCE.

SPECIFICATION forming part of Letters Patent No. 471,831, dated March 29, 1892.

Application filed November 13, 1891. Serial No. 411,791. (No model.)

*To all whom it may concern:*

Be it known that I, JOHN SPEAKMAN, a citizen of the United States, residing at New Castle, in the county of Henry and State of Indiana, have invented certain new and useful Improvements in Wire-and-Picket Fences; and I do hereby declare the following to be a full, clear, and exact description of the invention, such as will enable others skilled in the art to which it appertains to make and use the same.

My invention has relation to improvements in combined wire-and-picket fences; and it consists in the novel construction and arrangement of the same, whereby a strong and impenetrable fence is produced, all as will be hereinafter more fully explained, and particularly pointed out in the appended claim.

The annexed drawings, to which reference is made, fully illustrates my invention, in which—

Figure 1 is a perspective view of my improved fence, and Fig. 2 is a detail view showing the bracing-wires.

Referring by letter to the accompanying drawings, A designates the fence, consisting of the posts *a a* and the pickets *b*, the horizontal line-wires *c*, and brace or oblique wires *d*. At suitable distances apart the posts *a* are set in the ground and between which is formed the panels of the fence. The horizontal wires *c c* are secured to the posts at about equal distances apart by nails or staples *e e*, and to these wires the pickets *b* are fastened by the oblique or brace wires. The horizontal wires enter kerfs *f* in the pickets on opposite sides, and the oblique wires are fastened at their ends to the posts, as at *g g*. The same are then carried obliquely in and out the horizontal wires to the pickets *b* and around the upper and lower ends thereof, as at *h*, thus firmly holding said wires and pickets to one another.

In the drawings I show but one panel of my improved fence; but any number of panels can thus be constructed by a continuation of the wires. These diagonal wires firmly brace the fence and provide, in connection with the horizontal line-wires, an impenetrable fence for small stock, as well as large stock, and the fence can be readily made firm, should it weaken or sag, by inserting a bar between the two meeting wires, as at *i*, and twisting them together, whereby said wires are drawn and bind the pickets and horizontal wires firmly together. The diagonal wires can be constructed so as to leave an alternating brace on each side of the fence, and without running the wire in and out of the line-wires; but in either case the brace-wires pass over the top line-wire and under the bottom line-wire and around the picket at the top and bottom thereof.

It will be seen from the above description and by reference to the annexed drawings that a fence as herein shown is braced firmly, any slack therein being easily taken up, and is prevented from sagging. At the same time it is ornamental, cheap to construct, and durable.

Having described my invention, what I claim, and desire to secure by Letters Patent, is—

In a wire-and-picket fence, in combination, the pickets, posts, line-wires, and securing-nails, continuous brace-wires crossing each other between each picket and twisted, as at *i*, said wires passing around the upper and lower ends of the pickets, the pickets having kerfs *f* to receive wires *c*, which are secured to the posts by nails and held securely in the kerfs by the diagonal wires, the latter serving the double use of bracing as well as holding the line-wires to the pickets, all as shown and described.

In testimony whereof I affix my signature in presence of two witnesses.

JOHN SPEAKMAN.

Witnesses:
WILLIAM A. BROWN,
DANIEL K. COOK.